(12) United States Patent
Li et al.

(10) Patent No.: US 9,029,497 B2
(45) Date of Patent: *May 12, 2015

(54) METHOD OF MAKING POLYLACTIC ACID USING CARBENE DERIVATIVES AS THE CATALYST

(75) Inventors: Zhenjiang Li, Nanjing (CN); Pingkai Ouyang, Nanjing (CN); He Huang, Nanjing (CN)

(73) Assignee: Nanjing University of Technology, Nanjing, Jiangsu (CN)

(*) Notice: Subject to any disclaimer, the term of this patent is extended or adjusted under 35 U.S.C. 154(b) by 263 days.

This patent is subject to a terminal disclaimer.

(21) Appl. No.: 13/034,119

(22) Filed: Feb. 24, 2011

(65) Prior Publication Data

US 2011/0152493 A1 Jun. 23, 2011

Related U.S. Application Data

(63) Continuation-in-part of application No. PCT/CN2009/073677, filed on Sep. 2, 2009.

(30) Foreign Application Priority Data

Sep. 1, 2008 (CN) .......................... 2008 1 0146617

(51) Int. Cl.
C08G 63/08 (2006.01)
C08G 63/81 (2006.01)
C08G 63/82 (2006.01)
(Continued)

(52) U.S. Cl.
CPC ................. C08G 63/08 (2013.01); *B01J 31/40* (2013.01); C08G 63/81 (2013.01); C08G 63/823 (2013.01); *B01J 31/04* (2013.01)

(58) Field of Classification Search
None
See application file for complete search history.

(56) References Cited

U.S. PATENT DOCUMENTS 3,736,646 A 6/1973 Schmitt et al.
4,045,418 A 8/1977 Sinclair
(Continued)

FOREIGN PATENT DOCUMENTS

CN 1325913 12/2001
CN 1544504 11/2004
(Continued)

OTHER PUBLICATIONS

"Substituent, n. (and adj.)." OED Online. Oxford University Press, Mar. 2014. Web. Mar. 18, 2014.*
(Continued)

*Primary Examiner* — Rachel Kahn
(74) *Attorney, Agent, or Firm* — Novick, Kim & Lee, PLLC; Allen Xue (57) ABSTRACT

This disclosure provides a method of making polylactic acid using carbon dioxide adducts of carbenes, wherein the adducts of carbenes have a structure represented by formula (I) as follows:

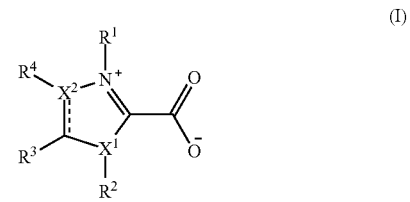

16 Claims, 3 Drawing Sheets (51) Int. Cl.
B01J 31/40 (2006.01)
B01J 31/04 (2006.01)

(56) References Cited

U.S. PATENT DOCUMENTS

| | | | |
|---|---|---|---|
| 4,057,537 A | 11/1977 | Sinclair | |
| 5,235,031 A | 8/1993 | Drysdale et al. | |
| 5,357,034 A | 10/1994 | Fridman et al. | |
| 5,508,378 A * | 4/1996 | Ohara et al. | 528/354 |
| 5,574,129 A | 11/1996 | Miyoshi et al. | |
| 5,696,219 A | 12/1997 | Jallouli et al. | |
| 6,569,989 B2 | 5/2003 | Ohara et al. | |
| 6,875,839 B2 | 4/2005 | Gerking et al. | |
| 7,772,350 B2 | 8/2010 | Blanc-Magnard et al. | |
| 2006/0100365 A1 | 5/2006 | Tam et al. | |
| 2007/0252311 A1 | 11/2007 | Tam et al. | |

FOREIGN PATENT DOCUMENTS

| | | |
|---|---|---|
| CN | 1814644 | 8/2006 |
| CN | 1814645 | 8/2006 |
| JP | 7304859 A | 11/1995 |
| JP | 2850101 B2 | 1/1999 |
| JP | 2002300898 | 10/2002 |

OTHER PUBLICATIONS

"Molten, adj." OED Online. Oxford University Press, Mar. 2014. Web. Mar. 18, 2014.*

"Melt, v.1." OED Online. Oxford University Press, Mar. 2014. Web. Mar. 18, 2014.*

Arduengo et al (An Air Stable Carbene and Mixed Carbene "Dimers," J. Am. Chem. Soc., 1997, 119 (52), pp. 12742-12749).*

Hedrick et al (Stereoselective polymerization of rac- and meso-lactide catalyzed by sterically encumbered N-heterocyclic carbenes, Chem. Commun., 2006, p. 2881-2883).*

Conner et al., "First Example of N-Heterocyclic Carbenes as Catalysts for Living Polymerization: Organocatalytic Ring-Opening Polymerization of Cyclic Esters," Journal of the American Chemical Society, 2002, 124, 914-915.

Duong et al., "Reversible carboxylation of N-heterocyclic carbenes," Chemical Communications, 2004, 112-113.

Tudose et al., "Imidazol(in)ium-2-carboxylates as N-heterocyclic carbene precursors in ruthenium—arene catalysts for olefin metathesis and cyclopropanation," Journal of Organometallic Chemistry, 2006, 691, 5356-5365.

Jacobsen et al., "Single-step reactive extrusion of PLLA in a corotating twin-screw extruder promoted by 2-ethylhexanoic acid tin(II) salt and triphenylphosphine," Polymer, 2000, 41(9), 3395-3403.

Nederberg et al., "New Paradigms for Organic Catalysts: The First Organocatalytic Living Polymerization," Angewandte Chemie International Edition, 2001, 40, 2712-2715.

Nyce et al., "In Situ Generation of Carbenes: A General and Versatile Platform for Organocatalytic Living Polymerization," Journal of the American Chemical Society, 2003, 125, 3046-3056.

Nyce et al., "A General and Versatile Approach to Thermally Generated N-Heterocyclic Carbenes," Chemistry—A European Journal, 2004, 10, 4073-4079.

Csihony et al., "Single-Component Catalyst/Initiators for the Organocatalytic Ring-Opening Polymerization of Lactide," Journal of the American Chemical Society, 2005, 127, 9079-9084.

Holbrey et al., "1,3-Dimethylimidazolium-2-carboxylate: the unexpected synthesis of an ionic liquid precursor and carbene-CO2 adduct," Chemical Communications, 2003, 28-29.

Voutchkova et al., "Disubstituted Imidazolium-2-Carboxylates as Efficient Precursors to N-Heterocyclic Carbene Complexes of Rh, Ru, Ir, and Pd," Journal of the American Chemical Society, 2005, 127, 17624-17625.

Tudose et al., "Imidazol(in)ium carboxylates as N-heterocyclic carbene ligand precursors for Suzuki-Miyaura reactions," Tetrahedron Letters, 2006, 47, 8529-8533.

Tudose et al., Journal of Organometallic Chemistry, 2006, 691, 5356-5365.

Kato et al., "Enzymatic Synthesis of Polythioester by the Ring-Opening Polymerization of Cyclic Thioester," Biomacromolecules, 2007, 8, 3590-3596.

Coulembier et al., "From controlled ring-opening polymerization to biodegradable aliphatic polyester: Especially poly(b-malic acid) derivatives," Progress in Polymer Science, 2006, 31, 723-747.

Dove et al., "N-Heterocyclic carbenes: Effective organic catalysts for living polymerization," Polymer, 2006, 47, 4018-4025.

Culkin et al., "Zwitterionic Polymerization of Lactide to Cyclic Poly(Lactide) by Using N-Heterocyclic Carbene Organocatalysts," Angewandte Chemie International Edition, 2007, 46, 2627-2630.

Csihony et al., "Bredereck's Reagent Revisited: Latent Anionic Ring-Opening Polymerization and Transesterification Reactions," Advanced Synthesis and Catalysis, 2004, 346, 1081-1086.

Coulembier et al., "Latent, Thermally Activated Organic Catalysts for the On-Demand Living Polymerization of Lactide," Angewandte Chemie International Edition, 2005, 44, 4964-4968.

* cited by examiner

METHOD OF MAKING POLYLACTIC ACID USING CARBENE DERIVATIVES AS THE CATALYST

CROSS-REFERENCES TO RELATED APPLICATIONS

This application is a continuation-in-part of International Application No. PCT/CN2009/073677, filed Sep. 2, 2009, which claims the benefit of Chinese Patent Application No. 200810146617.9, filed Sep. 1, 2008.

TECHNICAL FIELD

This disclosure is in the technical field of polymeric material, specifically involving the use of carbene derivatives, e.g., $CO_2$ adducts of carbenes, as catalysts in the preparation of polylactic acid.

BACKGROUND

Polylactic acid, also known as polylactide, as a completely biodegradable material that derives from renewable resources of agricultural crops, have attracted world-wide attention and research efforts. New methods for manufacturing polylactic acid are needed.

BRIEF SUMMARY OF THE DISCLOSURE

The disclosure herein provides a method that uses a new type of carbene derivatives as the catalyst in the preparation of polylactic acid.

In these carbene derivatives, the temperature decarboxylation at the second position ($CO_2$ removal) varies according to different substituents on ring of N-heterocyclic carbene. Consequently, one can design carbene derivatives according to the temperature of in situ generation of carbene in the polymerization system, therefore controlling the decarboxylation temperature, and control the polymerization process by controlling the temperate. Furthermore, carbon dioxide adducts of carbenes are heated and experience decarboxylation in the polymerization conditions to form the corresponding N-heterocyclic carbenes. $CO_2$ is vented from the reaction system. N-heterocyclic carbenes catalyzes the lactide ring-opening polymerization to obtain polylactic acid in the presence of alcohol initiators.

This disclosure also provides that different substituents on the $CO_2$ adducts of heterocyclic carbenes will affect the decarboxylation temperature on the 2-position of heterocyclic ring. While the appropriate decarboxylation temperature and its range are determined according to the property of the polymer and the process condition of the polymerization equipment. All $CO_2$ adducts of heterocyclic carbenes do not have the appropriate decarboxylation temperature for lactide ring-opening polymerization. To ensure that the decarboxylation of $CO_2$ adducts of carbenes occur in the same temperature range of the ring-opening polymerization, so that to produce active catalyst to promote the catalytic reaction, thermal gravimetric analysis were conducted on $CO_2$ adducts of carbenes having different substituents on the structure of carbenes. The temperature and rate of decarboxylation of $CO_2$ adducts of carbenes of various structure were obtained. Among them, a group of suitable catalysts were chosen so that the decarboxylation temperature and the reaction temperature of lactide ring-opening polymerization can properly match. Under the suitable reaction temperature the catalytic ring-opening polymerization can be effectively carried out. Therefore, through controlling its reaction temperature, lactide ring-opening polymerization catalyzed by $CO_2$ adducts of carbenes becomes controllable.

The terminal structure and molecular weight of polylactic acid can be controlled. For example, using active hydrogen containing compounds (ROH) as the initiator in the ring-opening polymerization reaction results in polylactic acid with terminal structure of RO— and —OH. While the ratio of the lactide and initiator determines the target molecular weight of polylactic acid. In the presence of the initiator, N-heterocyclic carbene catalyzed ring-opening polymerization of lactide is living polymerization, while reactive extrusion system also has a good dispersion. The polylactic acid so obtained may have a relatively narrow molecular weight distribution.

This disclosure further provides a method of making polylactic acid using $CO_2$ adducts of carbenes, wherein the adducts has a structure represented by formula (I):

(I)

wherein the dotted line together with the solid line parallel to it represents a single bond or a double bond, $X^1$ is chosen from S and N; $X^2$ is chosen from C and N; $R^1$ and $R^2$ can be the same or different and are chosen from
hydrogen,
alkyl groups having 1 to 10 carbon atoms,
alkyl groups having 1 to 10 carbon atoms and also having one or more substituents chosen from halogens, a hydroxyl group, a phenyl group, and a cyano group,
cycloalkyl groups having 3 to 6 carbon atoms,
a halogen atom,
an adamantane group,
a phenyl group, and
a phenyl group having one or more substituents chosen from halogens, a hydroxyl group, an alkyl group, and a cyano group;
$R^3$ and $R^4$ can be the same or different and are chosen from
hydrogen,
a halogen atom,
a cyano group,
a hydroxyl group,
alkyl groups having 1 to 4 carbon atoms,
alkyl groups having 1 to 4 carbon atoms and also having one or more substituents chosen from halogens, a hydroxyl group, a phenyl group, and a cyano group,
a phenyl group, and
a substituted phenyl group.
Alternatively, $R^3$ and $R^4$ are connected to form cycloalkyl or cycloalkenyl rings having 3 to 8 carbon atoms fused to the five-membered ring that contains $X_1$, $X_2$, and the nitrogen atom (in which case $X_2$ and the carbon atom in the 5-membered ring next to $X_2$ are also part of said cycloalkyl or cycloalkenyl rings); or $R^3$ and $R^4$ are connected to form a benzene ring fused to the five-membered ring that contains $X_1$, $X_2$, and the nitrogen atom (in which case $X_2$ and the carbon atom in the 5-membered ring next to $X_2$ are also part of said benzene ring); or $R^2$ and $R^3$ are connected to form 5-membered or 6-membered N-heterocyclic rings having no substituent, which are fused to the five-membered ring that contains $X_1$, $X_2$, and the nitrogen atom (in which case $X_1$ and the carbon atom in the 5-membered ring connected to $R^3$ are also part of said 5-membered or 6-membered N-heterocyclic rings).

Specific examples of $CO_2$ adducts of carbenes of formula (I) can be represented as in formula (II), formula (III), formula (IV), or formula (V):

(II)

(III)

(IV)

(V)

In formula (II), $R^1$ and $R^2$ can be the same or different and are chosen from
hydrogen,
alkyl groups having 1 to 10 carbon atoms,
alkyl groups having 1 to 10 carbon atoms and also having one or more substituents chosen from halogens, a hydroxyl group, a phenyl group, and a cyano group,
cycloalkyl groups having 3 to 6 carbon atoms,
a halogen atom,
an adamantane group,
a phenyl group, and
a phenyl group having one or more substituents chosen from halogens, a hydroxyl group, an alkyl group, and a cyano group;
$R^3$ and $R^4$ can be the same or different and are chosen from
hydrogen,
a halogen atom,
a cyano group,
a hydroxyl group,
alkyl groups having 1 to 4 carbon atoms,
alkyl groups having 1 to 4 carbon atoms and also having one or more substituents chosen from halogens, a hydroxyl group, a phenyl group, and a cyano group,
a phenyl group, and
a substituted phenyl group.

Alternatively, $R^3$ and $R^4$ are connected to form cycloalkyl or cycloalkenyl rings having 3 to 8 carbon atoms fused to the five-membered ring that contains $X_1$, $X_2$, and the nitrogen atom (in which case $X_2$ and the carbon atom in the 5-membered ring next to $X_2$ are also part of said cycloalkyl or cycloalkenyl rings), or $R^3$ and $R^4$ are connected to form a benzene ring fused to the five-membered ring that contains $X_1$, $X_2$, and the nitrogen atom (in which case $X_2$ and the carbon atom in the 5-membered ring next to $X_2$ are also part of said benzene ring).

In formula (III), $R^1$ and $R^2$ can be the same or different and are chosen from
hydrogen,
alkyl groups having 1 to 10 carbon atoms,
alkyl groups having 1 to 10 carbon atoms and also having one or more substituents chosen from halogens, a hydroxyl group, a phenyl group, and a cyano group,
cycloalkyl groups having 3 to 6 carbon atoms,
a halogen atom,
an adamantane group,
a phenyl group, and
a phenyl group having one or more substituents chosen from halogens, a hydroxyl group, an alkyl group, and a cyano group;
$R^3$ and $R^4$ can be the same or different and are chosen from
hydrogen,
a halogen atom,
a cyano group,
a hydroxyl group,
alkyl groups having 1 to 4 carbon atoms,
alkyl groups having 1 to 4 carbon atoms and also having one or more substituents chosen from halogens, a hydroxyl group, a phenyl group, and a cyano group, t
a phenyl group, and
a substituted phenyl group.

Alternatively, $R^3$ and $R^4$ are connected to form cycloalkyl or cycloalkenyl rings having 3 to 8 carbon atoms fused to the five-membered ring that contains $X_1$, $X_2$, and the nitrogen atom (in which case $X_2$ and the carbon atom in the 5-membered ring next to $X_2$ are also part of said cycloalkyl or cycloalkenyl rings).

In formula (IV), $R^1$ is chosen from
hydrogen,
alkyl groups having 1 to 10 carbon atoms,
alkyl groups having 1 to 10 carbon atoms and also having one or more substituents chosen from halogens, a hydroxyl group, a phenyl group, and a cyano group,
cycloalkyl groups having 3 to 6 carbon atoms,
a halogen atom,
an adamantane group,
a phenyl group, and
a phenyl group having one or more substituents chosen from halogens, a hydroxyl group, an alkyl group, and a cyano group;
$R^3$ and $R^4$ can be the same or different and are chosen from
hydrogen,
a halogen atom,
a cyano group,
a hydroxyl group,
alkyl groups having 1 to 4 carbon atoms,
alkyl groups having 1 to 4 carbon atoms and also having one or more substituents chosen from halogens, a hydroxyl group, a phenyl group, and a cyano group,
a phenyl group, and
a substituted phenyl group.

Alternatively, $R^3$ and $R^4$ are connected to form cycloalkyl or cycloalkenyl rings having 3 to 8 carbon atoms fused to the five-membered ring that contains $X_1$, $X_2$, and the nitrogen atom (in which case $X_2$ and the carbon atom in the 5-membered ring next to $X_2$ are also part of said cycloalkyl or cycloalkenyl rings) or $R^3$ and $R^4$ are connected to form a benzene ring fused to the five-membered ring that contains $X_1$, $X_2$, and the nitrogen atom (in which case $X_2$ and the carbon atom in the 5-membered ring next to $X_2$ are also part of said benzene ring). In formula (V) in, $R^1$ and $R^2$ can be the same or different and are chosen from hydrogen, alkyl groups having 1 to 10 carbon atoms, alkyl groups having 1 to 10 carbon atoms and also having one or more substituents chosen from halogens, a hydroxyl group, a phenyl group, and a cyano group, cycloalkyl groups having 3 to 6 carbon atoms, a halogen atom, an adamantane group, a phenyl group, and a phenyl group having one or more substituents chosen from halogens, a hydroxyl group, an alkyl group, and a cyano group;

$R^3$ is chosen from hydrogen, a halogen atom, a cyano group, a hydroxyl group, alkyl groups having 1 to 4 carbon atoms, alkyl groups having 1 to 4 carbon atoms and also having one or more substituents chosen from halogens, a hydroxyl group, a phenyl group, and a cyano group, a phenyl group, and a substituted phenyl group.

Alternatively, $R^2$ and $R^3$ are connected to form 5-membered or 6-membered N-heterocyclic rings having no substituent, which are fused to the five-membered ring that contains $X_1$, $X_2$, and the nitrogen atom (in which case $X_1$ and the carbon atom in the 5-membered ring connected to $R^3$ are also part of said 5-membered or 6-membered N-heterocyclic rings).

The above-described substituted phenyl group can have one, two, or three substituents. The substituents can be the same or different, chosen from halogens, a hydroxyl group, an alkoxy group, and a cyano group, alkyl groups having 1-5 carbon atoms, alkyl groups having 1-5 carbon atoms with one or more substituents chosen from halogens, a hydroxyl group, a phenyl group, and a cyano group The above-described methods of making polylactic acid can be solution polymerization, involving mixing $CO_2$ adducts of carbenes, the initiator, and lactide monomer in an organic solvent according to a molar ratio of 1:0.2 to 5:2 to 10000, preferably of 1:0.5 to 3:100 to 500, more preferably of 1:0.5 to 2:100 to 300. The reaction temperature is −50 to 250° C., preferably 50° C. to 180° C., more preferably 60° C. to 150° C. The reaction time ranges from 3 seconds to 120 hours, preferably 0.2 to 24 hours, more preferably 0.2 to 15 hours.

The above-described method of preparing polylactic acid can also be used bulk polymerization, specifically comprising mixing $CO_2$ adducts of carbenes, the initiator, and lactide monomer according to a molar ratio of 1:0.2 to 5:2 to 10000, preferably of 1:0.5 to 3:100 to 500, more preferably of 1:0.5 to 2:100 to 300. The reaction temperature is −50 to 250° C., preferably 50° C. to 180° C., more preferably 60° C. to 150° C. The reaction time ranges from 3 seconds to 120 hours, preferably 0.2 to 24 hours, more preferably 0.2 to 15 hours.

In the solution polymerization and bulk polymerization, the above-described initiator can be alcohol compounds, such as methanol, ethanol, propanol, isopropanol, n-butanol, tert-butyl alcohol, benzyl alcohol, phenethyl alcohol, ethyl glycol, diethylene glycol, pentaerythritol, preferably n-butanol, benzyl alcohol, and phenethyl alcohol. The above-described lactide can be L-lactide, D-lactide, meso-lactide, or racemic lactide, or a mixture of any proportion between L-lactide and D-lactide. The step to terminate the reaction is to add weak acid (such as formic acid, acetic acid, hydrochloric acid, etc.), oxygen, water, $CS_2$ or $CO_2$, preferably formic acid, acetic acid, water, or $CS_2$.

In solution polymerization, the organic solvent used can be cyclohexane, hexane, ethyl ether, acetone, cyclohexanone, dioxane, tetrahydrofuran, benzene, toluene, xylene, methylene chloride, chloroform, N,N-dimethylformamide, N,N-dimethylacetamide, or dimethyl sulfoxide, preferably acetone, tetrahydrofuran, toluene, xylene, methylene chloride, chloroform, more preferably tetrahydrofuran and toluene. The reaction can be carried out in an inert gas. The inert gas is preferably argon or nitrogen. The reaction product is preferred to be purified in an antisolvent, such as methanol, ethanol, or water.

In bulk polymerization, the reaction can be carried out in inert gas or under vacuum. The inert gas is preferably argon or nitrogen. The vacuum means the absolute pressure in the reactor is 4 to 20 mmHg. The reaction product is dissolved in a good solvent and then precipitated by adding an antisolvent, such as methanol, ethanol, or water purification. The good solvent can be dichloromethane, chloroform, toluene, benzene, acetone or tetrahydrofuran, preferably dichloromethane, chloroform, tetrahydrofuran.

The disclosure also provides the utility of $CO_2$ adducts of carbenes in the preparation of catalyst used in polylactic acid preparation.

In the method of using carbene derivatives to catalyze polylactic acid preparation provided in this disclosure, $CO_2$ adducts of carbenes have different substituents, which are used as the catalyst, have different decarboxylation temperatures. Further, the rate of decarboxylation differs at different temperature. Therefore, one may select a $CO_2$ adduct of carbene that has a suitable decarboxylation temperature as the catalyst for ring-opening polymerization, so that to control the lactide ring-opening polymerization through controlling the decarboxylation temperature. The removed $CO_2$ is vented, leaving no pollutant in the polymerization system. This method if effective and environmentally friendly. $CO_2$ adducts of carbenes are structurally stable, can be stored under normal conditions, keeping its property intact for a long period of time. It is also easy to use, without requiring operation under exacting reaction conditions. The catalytic reactivity is high in both a solution polymerization system and a bulk polymerization system.

BRIEF DESCRIPTION OF THE DRAWINGS

Examples of this disclosure are described in details with reference to the drawings in the following.

DETAILED DESCRIPTION

The following examples are used to further illustrate the present disclosure and in no way limit the disclosure. One of ordinary skill in the art would appreciate that these examples do not limit the present disclosure in any aspects, and that appropriate modification and adjustment of the parameters can be made without violating the essence of this disclosure and deviation from the scope of the present disclosure.

CO$_2$ adducts of carbenes used in the examples in this disclosure are shown in Table 1.

TABLE 1

Carbon dioxide adducts of carbenes used in the examples

| No. | Structure |
| --- | --- |
| A | |
| B | |
| C | |
| D | |
| E | |
| F | |
| G | |
| H | |
| I | |
| J | |
| K | |
| L | |
| M | |
| N | |
| O | |

TABLE 1-continued

Carbon dioxide adducts of carbenes used in the examples

| No. | Structure |
|---|---|
| P | (1,3-di-tert-butyl-imidazolium-2-carboxylate) |
| Q | (1-phenyl-3-methyl-imidazolium-2-carboxylate) |
| R | (3-tert-butyl-4,5-dichloro-thiazolium-2-carboxylate) |
| S | (3-(1-phenylethyl)-thiazolium-2-carboxylate) |
| T | (1,3,5-triphenyl-1,2,4-triazolium-2-carboxylate) |

Figure 1:
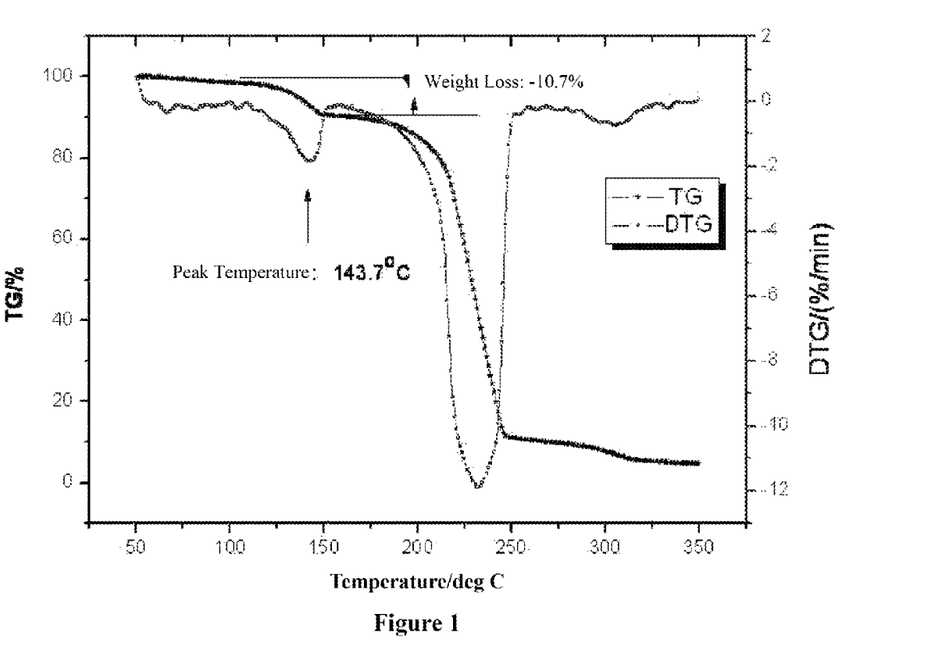
FIG. 1: A TGA graph of a salt of 1,3-bis(2,6-diisopropyl-phenyl)imidazole-2-carboxylic.

The range of decarboxylation temperature in this disclosure was obtained using TGA analysis. The equipment and test conditions were: TG/DTA (NETZSCHSTA449C), $N_2$ protection, heating rate 5° C./min, temperature range 50 to 350° C. Using the salt of 1,3-bis(2,6-diisopropyl-phenyl)imidazole-2-carboxylic acid as an example, its TG/DTG graph is shown in FIG. 1.

The reaction conversion was measured using $^1H$ NMR. The equipment and test conditions were: NMR (Bruker DRX500), solvents were d-$CHCl_3$, d-DMSO or d-$CH_3COCH_3$. The average molecular weight of polylactic acid and the dispersion were determined using size-exclusion chromatography (SEC), the test conditions were: column temperature: 25° C., solvent: THF (HPLC), flow rate: 1 mL/min, HPLC Pump: Waters 515, Detector: RI (Wyatt Optilab rEX), column: HR3, HR4, and HR5 Styragel connected in series, standard sample: polystyrene (PS) $M_w$=900 to 1.74× $10^6$ g/mol, PDI<1.1.

EXAMPLE 1

Figure 2:
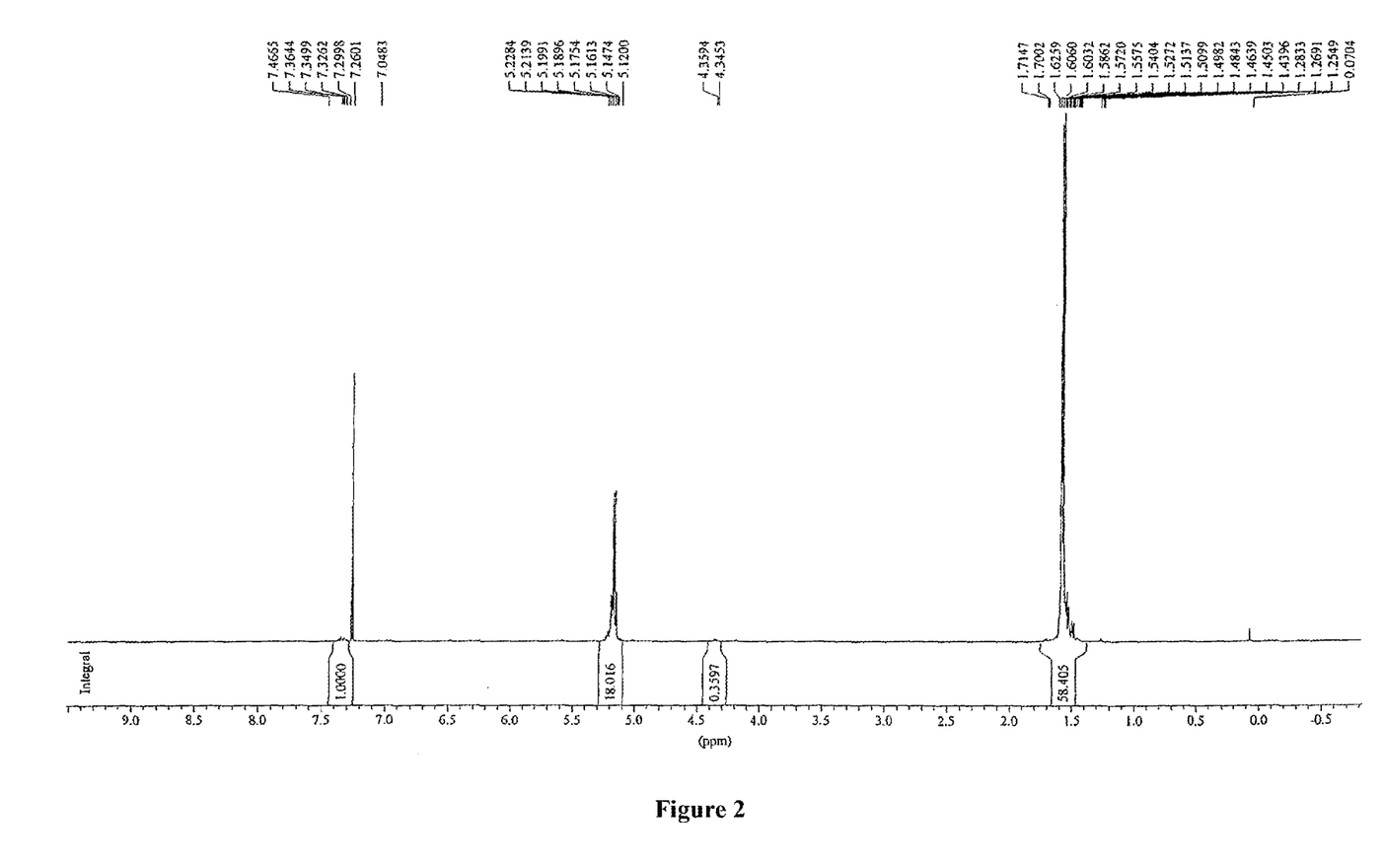
FIG. 2: A $^1$H NMR spectrum of polylactic acid prepared using a salt of 1,3-bis(2,6-diisopropyl-phenyl)imidazole-2-carboxylic as the catalyst.
Figure 3:
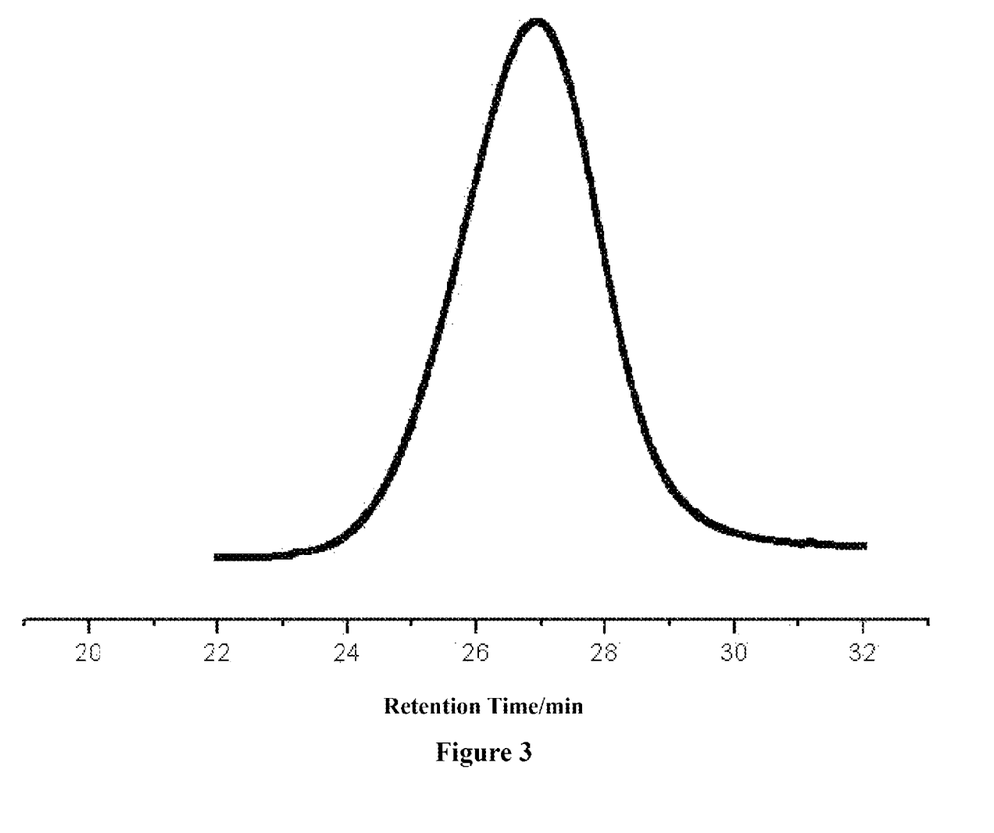
FIG. 3: A chromatogram of size-exclusion chromatography of polylactic acid prepared using a salt of 1,3-bis(2,6-diisopropyl-phenyl)imidazole-2-carboxylic acid as the catalyst.

1,3-bis(2,6-diisopropyl-phenyl)imidazole-2-carboxylic acid salt (A) (29 mg, 75 μmol), benzyl alcohol (5.4 mg, 50 μmol), L-lactide (1.44 g, 10 mmol) were dissolved in 10 mL of xylene. The solution was heated under the protection of the $N_2$ to 140° C., and reacted for 30 minutes. The reaction was terminated by adding formic acid. The reaction mixture was added into methanol. The precipitate was filtered and dried to a constant weight, obtaining 1.20 g of white solid. The conversion was 86%. The number average molecular weight of the polylactic acid $M_n$ was 18,460. The polydispersity index PDI was 1.05. The $^1H$ NMR spectrum and SEC chromatogram of the obtained polylactic acid are shown in FIGS. 2 and 3 respectively.

EXAMPLE 2

1,3-bis(o-methylphenyl)imidazoline-2-carboxylic acid salt (J) (73.54 mg, 250 μmol), benzyl alcohol (5.4 mg, 50 μmol), L-lactide (0.72 g, 12.5 mmol) were added into a reaction vessel and heated under the protection of Ar to 130° C. The reaction in the molten mixture was carried out for 1 hour. The reaction was terminated by adding water. The reaction mixture was dissolved in chloroform and then added into ethanol. The precipitate was filtered and dried to a constant weight, obtaining 0.67 g of white solid. The conversion was 95%. The number average molecular weight of the polylactic acid $M_n$ was 32,780. The polydispersity index PDI was 1.16.

EXAMPLE 3

1-butyl-3-methylimidazolium-2-carboxylic acid salt (O) (18.21 mg, 100 μmol), n-butanol (7.41 mg, 100 μmol), D-lactide (5.76 g, 40 mmol) were added into a reaction vessel. The reaction vessel was under vacuum at a pressure of 7 mmHg. The reaction was carried out at −50° C. for 60 hours. The reaction was terminated by adding hydrochloric acid. The reaction mixture was dissolved with dichloromethane then added into ethanol. The precipitate was filtered and dried to a constant weight, obtaining 2.30 g of white solid. The conversion was 54% conversion. The number average molecular weight of the polylactic acid $M_n$ was 24,850. The polydispersity index PDI was 1.19.

EXAMPLE 4

1,3-bis(2,6-diisopropyl-phenyl)imidazoline-2-carboxylic acid salt (D) (32.6 g, 75 mmol), methanol (1.6 g, 50 mmol), L-lactide (21.6 g, 150 mmol) was added into the reaction vessel and dissolved using 500 mL of THF. The solution was heated under the protection of Ar to 40° C., stirred and let react for 48 hours. The reaction was terminated by adding benzoic acid. The reaction mixture was condensed and added into methanol. The precipitate was filtered and dried to a constant weight to obtain 13.58 g of white solid. The conversion was 63%. The number average molecular weight of the polylactic $M_n$ was 432. The polydispersity index was PDI 1.00.

EXAMPLE 5

1-phenyl-3-methylimidazolium-2-carboxylic acid salt (Q) (16.2 mg, 75 μmol), benzyl alcohol (10.8 mg, 100 μmol), D-lactide (2.88 g, 20 mmol) was added into a reaction vessel. The reaction vessel was under vacuum at a pressure of 7 mmHg. The reaction was carried out at 0° C. for 5 days. The reaction was terminated by adding water. The reaction mixture was dissolved in toluene. The solution was then added into ethanol. The precipitate was filtered and dried to a constant weight to obtain 1.3 g of white solid. The conversion rate was 49%. The number average molecular weight of polylactic acid $M_n$ was 18,750. The polydispersity index PDI was 1.08.

EXAMPLE 6

1,3-dimethyl imidazole-2-carboxylic acid salt (N) (14.01 mg, 75 µmol), ethylene glycol (1.86 mg, 30 µmol), D, L-lactide (2.16 g, 15 mmol) were added into a reaction vessel. The mixture was heated under the protection of Ar to 96° C. The reaction in the molten mixture was carried out for 2 hours. The reaction was terminated by adding $CS_2$. The reaction mixture was dissolved in chloroform. The solution was then added into methanol. The precipitate was filtered and dried to a constant weight to obtain 2.10 g of white solid. The conversion was 99% conversion. The number average molecular weight of polylactic acid $M_n$ as 34,900. The polydispersity index PDI was 1.28.

EXAMPLE 7

1,3-bis(2,4,6-trimethyl-phenyl)imidazoline-2-carboxylic acid salt (E) (32.6 mg, 75 µmol), benzene, ethanol (9.16 mg, 75 µmol), D-lactide (1.44 g, 10 mmol) were added into a reaction vessel. The reaction vessel was under vacuum of at a pressure of 4 mm Hg. The reaction was carried out at 130° C. for 1 hour. The reaction was terminated by adding oxygen. The reaction mixture was dissolved in chloroform and then added into ethanol. The precipitate was filtered and dried to a constant weight to obtain 1.2 g of white solid. The conversion was 97%. The number average molecular weight $M_n$ of polylactic acid as 18,600. The polydispersity index PDI was 1.35.

EXAMPLE 8

1,3-bis(2,4,-trimethyl-phenyl) imidazole-2-carboxylic acid salt (B) (32.6 mg, 75 µmol), isopropanol (9.01 mg, 150 µmol), D-lactide (1.44 g, 10 mmol) were dissolved in 5 mL of N,N-dimethylformamide. The solution was heated under the protection of Ar to 96° C. and reacted for 12 hours. The reaction was terminated by adding water. The reaction mixture was added into methanol. The precipitate was filtered and dried to a constant weight to obtain 1.32 g of white solid. The conversion was 92%. The number average molecular weight of polylactic acid $M_n$ was 8,580. The polydispersity index PDI was 1.11.

EXAMPLE 9

1-butyl-3-methyl benzimidazol-2-carboxylic acid salt (M) (17.41 mg, 75 µmol), ethanol (1.73 mg, 37.5 µmol), D-lactide (8.64 g, 60 mmol) were dissolved in 100 mL of tetrahydrofuran. The solution was heated under the protection of Ar to 50° C. and reacted for 30 hours. The reaction was terminated by adding hydrochloric acid. The reaction mixture was condensed and added into methanol. The precipitate was filtered and dried to a constant weight to obtain 6.20 g of white solid. The conversion was 76%. The number average molecular weight of polylactic acid $M_n$ was 188,750. The polydispersity index PDI was 1.38.

EXAMPLE 10

1,3-2-butyl imidazole-2-carboxylic acid salt (I) (16.81 mg, 75 µmol), benzyl alcohol (10.8 mg, 100 µmol), D-lactide (1.44 g, 10 mmol) was added into a reaction vessel. The mixture was heated under the protection of Ar to 120° C. The reaction was carried out in the molten mixture for 2 hours. The reaction was terminated by adding $CS_2$. The reaction mixture was dissolved in chloroform and the solution was then added into methanol. The precipitate was filtered and dried to a constant weight to obtain 1.15 g of white solid. The conversion was 97%. The number average molecular weight of the polylactic acid $M_n$ was 14,210. The polydispersity index PDI was 1.32.

EXAMPLE 11

1,3-bis(o-methylphenyl)imidazole-2-carboxylic acid salt (G) (21.9 mg, 75 µmol), benzene, ethanol (12.21 mg, 100 µmol), L-lactide (1.44 g, 10 mmol) were added into a reaction vessel and heated under the protection of Ar to 250° C. The reaction was carried out in the molten mixture for 20 min. The reaction was terminated by adding hydrochloric acid. The reaction mixture was dissolved in chloroform and added into ethanol. The precipitate was filtered and dried to a constant weight to obtain 1.1 g of white solid. The conversion rate was 89%. The number average molecular weight of the polylactic acid $M_n$ as 11,960. The polydispersity index was PDI 1.48.

EXAMPLE 12

1,3-dicyclohexyl imidazole-2-carboxylic acid salts (C) (27.62 mg, 100 µmol), tert-butanol (14.81 mg, 200 µmol), D, L-lactide (7.2 g, 50 mmol) were dissolved in 50 mL of toluene. The solution was heated under the protection of Ar to 100° C. and reacted for 30 minutes. The reaction was terminated by adding acetic acid. The reaction mixture was added into methanol. The precipitate was filtered and dried to a constant weight to obtain 6.02 g of white solid. The conversion rate was 85%. The number average molecular weight of polylactic acid $M_n$ was 26,320. The polydispersity index PDI was 1.06.

EXAMPLE 13

1,3-di-tert-butyl-imidazole-2-carboxylic acid salt (P) (6.72 mg, 30 µmol), benzyl alcohol (16.21 mg, 150 µmol), D, L-lactide (3.46 g, 24 mmol) were added into a reaction vessel and heated under the protection of Ar to 200° C. The reaction was carried out in the molten mixture for 3 seconds. The reaction was terminated by adding oxygen. The reaction mixture was cooled and dissolved in toluene and added into ethanol. The precipitate was filtered and dried to a constant weight to obtain 2.5 g of white solid. The conversion rate was 76%. The number average molecular weight of the polylactic acid weight $M_n$ was 18,850. The polydispersity index PDI was 1.08.

EXAMPLE 14

1,3-bis(methylphenyl)imidazole-2-carboxylic acid salt (H) (29.21 mg, 100 µmol), propanol (3.00 mg, 50 µmol), D-lactide (43.2 g, 0.3 mol) were dissolved in 1000 mL of DMSO. The solution was heated under the protection of Ar to 80° C. and reacted for 30 minutes. The reaction was terminated reaction by added $CO_2$. The reaction mixture was added into methanol. The precipitate was filtered and dried to a constant weight to obtain 39.2 g of white solid. The conversion rate was 94%. The number average molecular weight of PLA $M_n$ was 820. The polydispersity index PDI was 1.00.

EXAMPLE 15

1-ethyl-3-methylimidazolium-2-carboxylic acid salt (F) (15.4 mg, 100 µmol), propanol (3.00 mg, 50 µmol), D-lactide (1.44 g, 10 mmol) were dissolved in 1 mL of DMSO. The solution was heated under the protection of Ar to 20° C. and reacted for 24 hours. The reaction was terminated by adding $CO_2$. The reaction mixture was added into methanol. The precipitate was filtered and dried to a constant weight to obtain 0.26 g of white solid. The conversion rate was 18%. The number average molecular weight of the polylactic acid weight Mn was 8,750. The polydispersity index PDI was 1.08.

EXAMPLE 16

1,3-bis(methylphenyl)imidazoline-2-carboxylic acid salt (K) (22.06 mg, 75 µmol), methanol (12 mg, 375 µmol), L-lactide (0.72 g, 5 mmol) was added into a reaction vessel and dissolved in 30 mL of tetrahydrofuran. The solution was heated under the protection of Ar to 40° C., stirred and let react for 48 hours. The reaction was terminated by adding benzoic acid. The reaction mixture was condensed and added into methanol. The precipitate was filtered and dried to a constant weight. 0.39 g of white solid. The conversion rate was 54% conversion rate. The number average molecular weight of the polylactic acid $M_n$ was 1,250. The polydispersity index PDI was 1.16.

EXAMPLE 17

1,3-butyl-3,4-dichloro-imidazole-2-carboxylic acid salt (L) (29.21 mg, 100 µmol), n-butanol (7.41 mg, 100 µmol), D-lactide (5.76 g, 40 mmol) were added into a reaction vessel. The reaction vessel was under vacuum at a pressure of 7 mmHg. The reaction was carried out at 250° C. for 5 hours. The reaction was terminated by adding hydrochloric acid. The reaction mixture was dissolved in dichloromethane and then added into ethanol. The precipitate was filtered and dried to a constant weight to obtain 5.5 g of white solid. The conversion rate was 99%. The number average molecular weight of the polylactic acid weight Mn was 48,780, The polydispersity index PDI was 1.48.

EXAMPLE 18

1-tert-butyl-4,5-dichloro-imidazole-2-carboxylate (R) (7.6 mg, 30 µmol), benzyl alcohol (16.21 mg, 150 µmol), D, L-lactide (3.46 g, 24 mmol) were added into a reaction vessel. The mixture was heated under the protection of Ar to 200° C. The reaction was carried out in the molten mixture for 3 seconds. The reaction was terminated by adding oxygen. The reaction mixture was cooled and dissolved in toluene. The solution was added into ethanol. The precipitate was filtered and dried to a constant weight to obtain 2.5 g of white solid. The conversion rate was 80%. The number average molecular weight of the polylactic acid weight Mn was 18,800, The polydispersity index PDI was 1.28.

EXAMPLE 19

1-(1-phenylethyl)thiazole-2-carboxylic acid salt (S) (17.5 mg, 75 µmol), benzyl alcohol (10.8 mg, 100 µmol), D-lactide (1.44 g, 10 mmol) was added into a reaction vessel and heated under the protection Ar to 120° C. The reaction was carried out in the molten mixture for 2 hours. The reaction was terminated by adding $CS_2$. The reaction mixture was dissolved in chloroform and then added into methanol. The precipitate was filtered and dried to a constant weight to obtain 1.15 g of white solid. The conversion rate was 97%. The number average molecular weight of the polylactic acid weight Mn was 13,210. The polydispersity index PDI was 1.32.

EXAMPLE 20

2,4,5-phenyl-1,2,4-triazole-3-carboxylic acid salt (T) (25.6 mg, 75 µmol), isopropanol (9.01 mg, 150 µmol), D-lactide (1.44 g, 10 mmol) was dissolved in 5 mL of N,N-dimethylformamide. The solution was heated under the protection of Ar to 96° C. and reacted for 12 hours. The reaction was terminated by adding water. The reaction mixture was added into methanol. The precipitate was filtered and dried to a constant weight to obtain 1.32 g of white solid. The conversion rate was 92%. The number average molecular weight of polylactic acid $M_n$ was 8,560. The polydispersity index PDI was 1.11.

What is claimed is:

1. A method of making polylactic acid through lactide polymerization, comprising:
   providing a carbon dioxide adduct of carbene;
   forming a reaction mixture comprising a lactide and the carbon dioxide adduct of carbene;
   adjusting a temperature of the reaction mixture to 50° C. to 180° C.,
   wherein the carbon dioxide adduct of carbene has a structure represented by formula (I):

wherein the dotted line together with the solid line parallel to the dotted line represent a single bond or a double bond;
   $X^1$ is N;
   $X^2$ is C; and
   wherein $R^1$ and $R^2$ are independently chosen from hydrogen,
   alkyl groups having 1 to 10 carbon atoms,
   alkyl groups having 1 to 10 carbon atoms and also having one or more substituents chosen from halogens, a hydroxyl group, a phenyl group, and a cyano group,
   cycloalkyl groups having 3 to 6 carbon atoms,
   a halogen atom, and
   an adamantane group;
   wherein $R^3$ and $R^4$ are independently chosen from substituted phenyl groups having one or more substituents, wherein the substituents are the same or different, chosen from halogens, a hydroxyl group, an alkyl group, an alkoxy group, a cyano group, alkyl groups having 1-5 carbon atoms, and alkyl groups having 1-5 carbon atoms with one or more substituents chosen from halogens, a hydroxyl group, a phenyl group, and a cyano group.

2. The method of claim 1, wherein the structure of carbon dioxide adduct of carbene is represented by formula (II)

(II)

3. The method of claim 1, wherein: the structure of carbon dioxide adduct of carbene is represented by formula (III):

(III)

4. The method according to claim 1, further comprising adding an initiator into the reaction mixture, wherein the initiator is an alcohol chosen from methanol, ethanol, propanol, isopropanol, n-butanol, tert-butyl alcohol, benzyl alcohol, ethylene glycol, diethylene glycol, pentaerythritol, and phenethyl alcohol.

5. The method of claim 4, wherein the carbon dioxide adduct of carbene, the initiator, and the lactide has a molar ratio of 1:0.2 to 5:2 to 10000.

6. The method of claim 5, wherein the molar ratio is 1:0.5 to 3:100 to 500.

7. The method of claim 6, wherein the molar ratio is 1:0.5 to 2:100 to 300.

8. The method according to claim 1, wherein the lactide is chosen from L-lactide, D-lactide, meso lactide, racemic lactide, and mixtures of L-lactide and D-lactide.

9. The method of claim 1, wherein the temperature of the reaction mixture is in the range of 60° C. to 150° C.

10. The method of claim 1, wherein the reaction mixture further comprises a solvent chosen from cyclohexane, hexane, ethyl ether, acetone, cyclohexanone, dioxane, tetrahydrofuran, benzene, toluene, xylene, dichloromethane, chloroform, N, N-dimethylformamide, N, N-dimethylacetamide, and dimethyl sulfoxide.

11. The method of claim 10, wherein the lactide has an initial concentration ranging from 0.01 mol/L to 10 mol/L.

12. The method of claim 11 wherein the initial concentration of the lactide ranges from 0.5 mol/L to 3 mol/L.

13. The method of claim 1, further comprising adding oxygen, water, $CS_2$, $CO_2$, or a weak acid into the reaction mixture, wherein the weak acid is chosen from formic acid, acetic acid, and hydrochloric acid.

14. The method of claim 10, further comprising adding the reaction mixture into an antisolvent chosen from methanol, ethanol, and water.

15. The method according to claim 1, wherein the reaction mixture undergoes bulk polymerization.

16. The method of claim 15, further comprising dissolving the molten reaction mixture in a solvent chosen from chloroform, dichloromethane, and toluene.

* * * * *